(12) United States Patent
Kusui et al.

(10) Patent No.: US 7,827,179 B2
(45) Date of Patent: Nov. 2, 2010

(54) DATA CLUSTERING SYSTEM, DATA CLUSTERING METHOD, AND DATA CLUSTERING PROGRAM

(75) Inventors: Dai Kusui, Tokyo (JP); Kenji Tateishi, Tokyo (JP); Haruka Saito, Tokyo (JP)

(73) Assignee: NEC Corporation, Tokyo (JP)

( * ) Notice: Subject to any disclaimer, the term of this patent is extended or adjusted under 35 U.S.C. 154(b) by 427 days.

(21) Appl. No.: 12/065,435

(22) PCT Filed: Sep. 1, 2006

(86) PCT No.: PCT/JP2006/317319

§ 371 (c)(1),
(2), (4) Date: Feb. 29, 2008

(87) PCT Pub. No.: WO2007/026870

PCT Pub. Date: Mar. 8, 2007

(65) Prior Publication Data

US 2009/0271420 A1  Oct. 29, 2009

(30) Foreign Application Priority Data

Sep. 2, 2005  (JP) .............................. 2005-254821

(51) Int. Cl.
*G06F 17/30* (2006.01)
(52) U.S. Cl. ...................................... 707/737; 707/778
(58) Field of Classification Search ................. 707/737, 707/778
See application file for complete search history.

(56) References Cited

U.S. PATENT DOCUMENTS 6,424,746 B1 *  7/2002  Nishida ...................... 382/195
2007/0156401 A1 *  7/2007  Nagano et al. .............. 704/239

FOREIGN PATENT DOCUMENTS

| JP | 07-085070 A | 3/1995 |
| JP | 07-141390 A | 6/1995 |
| JP | 08-147320 A | 6/1996 |
| JP | 11-203415 A | 7/1999 |
| JP | 2002-183171 A | 6/2002 |
| JP | 2003-316796 A | 11/2003 |
| JP | 2004-029969 A | 1/2004 |
| JP | 2005-128961 A | 5/2005 |

OTHER PUBLICATIONS

Hernandez, Mauricio A. et al.; "The Merge/Purge Problem for Large Databases"; Department of Computer Science, Columbia Universtiy, New York, NY 10027, published 1995.

* cited by examiner

*Primary Examiner*—Cam-Linh Nguyen
(74) *Attorney, Agent, or Firm*—Dickstein Shapiro LLP

(57) ABSTRACT

An object of the present invention is to perform data clustering while preventing the processing speed from decreasing while maintaining accuracy. A block division section 3 divides a block received from a DB access section 2 into sufficiently small blocks. A block storage section 8 stores blocks supplied from the block division section 3 and hierarchical relationship between the blocks. A block integration section 5 integrates blocks and groups in the order from a hierarchically deeper position to a shallower position based on the stored hierarchical relationship.

15 Claims, 17 Drawing Sheets

FIG.11

| ID | NAME | ADDRESS |
|---|---|---|
| 0001 | ABC CO. LTD | OSAKAHU OSAKASHI SUMIYOSHIKU 1-2-3 |
| 0002 | DEF CO. LTD | NARAKEN IKOMASHI TAKAYAMACHO 4-5 |
| 0003 | [EI-BI-SHI] CO. LTD | OSAKASHI SUMIYOSHIKU 1-2-3 |
| ... | ... | ... |
| 1000 | XYZ CO. LTD | NARAKEN NARASHI |

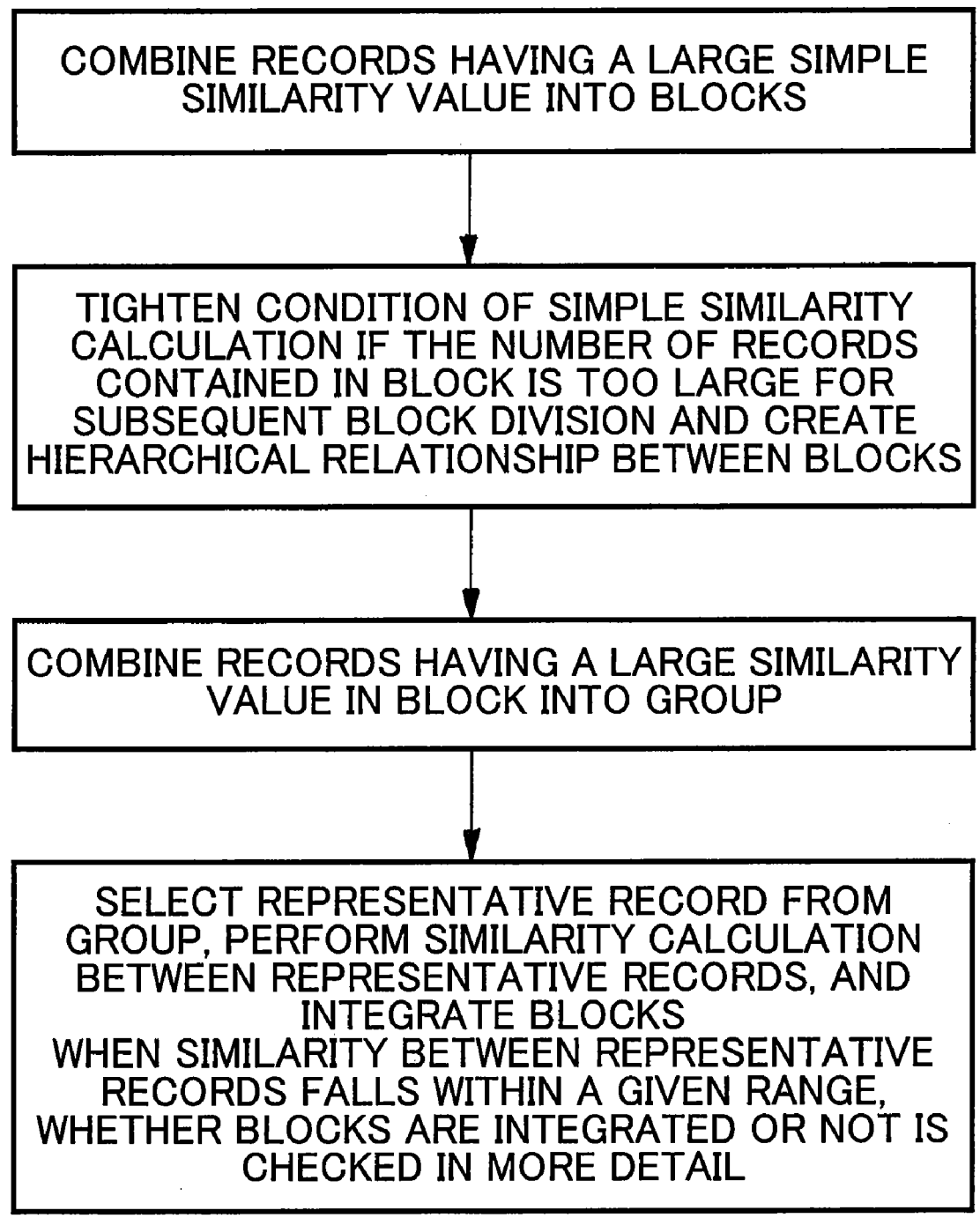

FIG.13

BLOCK CONTAINING RECORDS WHOSE FIRST ONE
CHARACTER OF NAME FIELD IS "A"(B1)

| ID | NAME | ADDRESS |
|---|---|---|
| 0001 | ABC CO. LTD | OSAKAHU OSAKASHI SUMIYOSHIKU 1-2-3 |
| 0010 | AXXX CO. LTD | HYOUGOKEN KOBESHI |
| ... | | ... |

BLOCK CONTAINING RECORDS WHOSE FIRST ONE
CHARACTER OF NAME FIELD IS "D"(B2)

| ID | NAME | ADDRESS |
|---|---|---|
| 0002 | DEF CO. LTD | NARAKEN IKOMASHI TAKAYAMACHO 4-5 |
| ... | | ... |

. . .

BLOCK CONTAINING RECORDS WHOSE FIRST ONE
CHARACTER OF ADDRESS FIELD IS [O] OR [DAI] (B3)

| ID | NAME | ADDRESS |
|---|---|---|
| 0001 | ABC CO. LTD | OSAKAHU OSAKASHI SUMIYOSHIKU 1-2-3 |
| 0003 | [EI-BI-SHI] CO. LTD | OSAKASHI SUMIYOSHIKU 1-2-3 |
| ... | | ... |

BLOCK CONTAINING RECORDS WHOSE FIRST FOUR CHARACTERS OF ADDRESS FIELD IS [O-SAKA-HU-O] (B8)

| ID | NAME | ADDRESS |
|---|---|---|
| 0001 | ABC CO. LTD | OSAKAHU OSAKASHI SUMIYOSHIKU 1-2-3 |
| ... | ... | ... |

} 90 RECORDS

BLOCK CONTAINING RECORDS WHOSE FIRST FOUR CHARACTERS OF ADDRESS FIELD IS [O-SAKA-HU-MORI] (B9)

| ID | NAME | ADDRESS |
|---|---|---|
| 0001 | DDD CO. LTD | OSAKAHU MORIGUCHISHI |
| ... | ... | ... |

} 11 RECORDS

BLOCK CONTAINING RECORDS WHOSE FIRST THREE CHARACTERS OF ADDRESS FIELD IS [O-SAKA-SHI] (B10)

| ID | NAME | ADDRESS |
|---|---|---|
| 0003 | [EI-BI-SHI] CO. LTD | OSAKASHI SUMIYOSHIKU 1-2-3 |
| ... | ... | ... |

} 9 RECORDS

BLOCK CONTAINING RECORDS WHOSE FIRST TWO CHARACTERS OF ADDRESS FIELD IS [DAI-TOU] (B11)

| ID | NAME | ADDRESS |
|---|---|---|
| 0003 | EEE CO. LTD | DAITOUSHI |

} 1 RECORD

DATA CLUSTERING SYSTEM, DATA CLUSTERING METHOD, AND DATA CLUSTERING PROGRAM

TECHNICAL FIELD

The present invention relates to a data clustering system, a data clustering method, and a data clustering program.

BACKGROUND ART

Hereinafter, in a method and apparatus that classify a plurality of data according to some criterion, a process of grouping substantially the same data is referred to as "duplicate record verification". The "substantially the same" indicates, e.g., a relationship between "NEC" and "enu-i-shi" or "1-chome 2-banchi" and "1-2", that is, a relationship between two data which do not completely coincide with each other in terms of digital data due to Japanese orthographic variation but can be determined to be the same by a human. In the case where duplication of records in a single database or between a plurality of databases is checked, if all combinations are checked, the number of combinations is explosively increased as the number of records is increased, with the result that enormous processing time is required in the duplication check processing.

In a conventional approach, the duplicate record verification is performed by combining a method (rough narrowing-down) with a lower accuracy but with a lighter processing load and a method (detailed narrowing-down) with a heavy processing load but with a high accuracy.

For example, in the case where duplication check is carried out for 100,000 records, the rough narrowing-down method is used first to combine the 100,000 records into a large number of blocks each including several thousand to several ten thousand records and then the detailed narrowing-down method is applied to each block.

As a technique for the rough narrowing-down method, there is known a Sorted Neighborhood Method (disclosed in Non-Patent Document 1) and the like.

As a technique for the detailed narrowing-down method, there is known a method using an edit distance (disclosed in Non-Patent Document 2) and the like. The edit distance is used for measuring similarity between character strings. As a similar technique, there are known a phonetic distance, input (typewriter) distance, and the like.

In the detailed narrowing-down method, similarity or distance between records is calculated followed by setting of a supplied threshold value, whereby the records are combined into groups. The grouped records may be determined as duplication record candidates by a human, or may directly be determined to be duplicated records. Thus, by combining the rough narrowing-down method and detailed narrowing-down method, efficiency of duplicate record verification processing has been improved.

Non-Patent Document 1: M. A. Hernandez and other one, Real-world Data is Dirty: Data Cleansing and the Merge/Purge Problem, Journal of Data Mining and Knowledge Discovery, Vol. 1, 1998

Non-Patent Document 2: M. Hernandez and other one, The Merge/Purge Problem for Large Databases, Proceedings of the 1995 ACM SIGMOD International Conference of DATA (SIGMOD 1995), 1995, pages 127 to 138

DISCLOSURE OF THE INVENTION

Problems to be Solved by the Invention

The rough narrowing-down method tends to be superior in processing speed but inferior in accuracy, while the detailed narrowing-down method tends to be superior in accuracy but inferior in processing speed. Therefore, when the number of records to be verified is increased, it is necessary to narrow down more records in the rough narrowing-down method in order to order to prevent the processing time from increasing, with the result that accuracy is degraded. Thus, a large number of records cannot be narrowed down in the rough narrowing-down method in order to maintain accuracy, thus incurring an increase in the processing time.

That is, a first problem is that as the number of records to be verified is increased, it becomes difficult to prevent the processing speed from decreasing while maintaining accuracy.

The second problem is that it is difficult to adequately set a threshold value for narrowing down the records in the rough narrowing-down method, which involves trial and error process. That is, if the threshold value for the narrowing-down in the rough narrowing-down method is too small, it is necessary to check a large number of combinations in the subsequent detailed narrowing-down method, which reduces the effect of the rough narrowing-down method. On the other hand, if the threshold value for the narrowing-down is too large, records that are supposed to be determined as the same group by tighter checking are eliminated from duplication record candidates in the stage of the rough narrowing-down method.

The present invention is made in view of the above problems, an object thereof is to prevent the processing speed from decreasing while maintaining accuracy even when the number of records to be verified is increased.

Another object of the present invention is to eliminate the need for the trial and error approach to the determination of a threshold value in the rough narrowing-down method.

Means for Solving the Problems

A first invention to solve the above problems is a data clustering system characterized by comprising: a simple similarity calculation section that receives a block containing at least one data and a block generation condition and divides the block based on the block generation condition; a block division section that repeatedly performs block division processing that allows the simple similarity calculation section to divide the block by supplying the block and block generation condition thereto to create a hierarchical relationship between the blocks obtained by the block division processing; a block storage section that stores blocks and the hierarchical relationship between the blocks; a similarity calculation section that calculates the similarity between combinations of data contained in a block; and a block integration section that allows the similarity calculation section to calculate the similarity between combination of data contained in a block and executes processing for combining groups each of which contains at least one data based on the calculation result of the similarity calculation section along the hierarchical relationship between blocks stored in the block storage section.

A second invention to solve the above problems is the data clustering system according to the first invention, characterized in that when performing additional block division processing, the block division section uses, as a new block generation condition, a block generation condition tighter than the original block generation condition.

A third invention to solve the above problems is the data clustering system according to the first or second invention, characterized in that the simple similarity calculation section uses a method with a lower accuracy but with a lower calculation load to calculate the simple similarity between data, and the similarity calculation section uses a method with a higher calculation load but with a higher accuracy to calculate the similarity between data.

A fourth invention to solve the above problems is the data clustering system according to the first, second, or third invention, characterized in that the block integration section uses representative data of groups to allow the similarity to be calculated and determines whether the groups can be combined or not.

A fifth invention to solve the above problems is the data clustering system according to the fourth invention, characterized in that the similarity calculation section determines "integration possible" "integration impossible" or "continuous check" as the result of the similarity calculation based on the similarity between the data combination and, when the result is "continuous check" and the data that have been subjected to the similarity calculation are represented data, calculates the similarity between combination of different data contained in the groups to which the representative data belong and determines "integration possible" or "integration impossible".

A sixth invention to solve the above problems is the data clustering system according to the first, second, third, fourth, or fifth invention, characterized in that when moving to a new block along the hierarchical relationship between blocks, the block integration section adds a check mark to a group containing only one data to exclude representative data of the group added with the check mark from the subsequent similarity calculation between the combination of data performed by the similarity calculation section.

A seventh invention to solve the above problems is the data clustering system according to the first, second, third, fourth, fifth, or sixth invention, characterized in that the data is a record on a database system.

An eighth invention to solve the above problems is a data clustering method, comprising the steps of: repeatedly performing block division processing that divides a block containing at least one data based on a block generation condition to create a hierarchical relationship between the blocks obtained by the block division processing; storing blocks and the hierarchical relationship between the blocks; and calculating the similarity between combination of data contained in a block and executing processing for combining groups each of which contains at least one data based on the calculation result of the similarity calculation along the hierarchical relationship between the stored blocks.

A ninth invention to solve the above problems is the data clustering method according to the eighth invention, characterized in that when performing additional block division processing, the step of creating the hierarchical relationship between blocks uses, as a new block generation condition, a block generation condition tighter than the original block generation condition.

A tenth invention to solve the above problems is the data clustering method according to the eighth or ninth invention, characterized in that the step of creating the hierarchical relationship between blocks divides the block based on simple similarity obtained using a method with a lower accuracy but with a lower calculation load and block generation condition, and the step of executing processing for combining groups uses a method with a higher calculation load but with a higher accuracy to calculate the similarity.

An eleventh invention to solve the above problems is the data clustering method according to the eighth, ninth, or tenth invention, characterized in that the step of executing processing for combining groups uses representative data of groups to calculate the similarity and determines whether the groups can be combined or not.

A twelfth invention to solve the above problems is the data clustering method according to the eleventh invention, characterized in that the step of executing processing for combining groups determines "integration possible" "integration impossible" or "continuous check" as the result of the similarity calculation based on the similarity between the data combination and, when the result is "continuous check" and the data that have been subjected to the similarity calculation are represented data, calculates the similarity between combination of different data contained in the groups to which the representative data belong to and determines "integration possible" or "integration impossible".

A thirteenth invention to solve the above problems is the data clustering method according to the eighth, ninth, tenth, eleventh, or twelfth invention, characterized in that when moving to a new block along the hierarchical relationship between blocks, the step of executing processing for combining groups adds a check mark to a group containing only one data to exclude representative data of the group added with the check mark from the subsequent similarity calculation between the combination of data performed by the similarity calculation section.

A fourteenth invention to solve the above problems is the data clustering method according to the eighth, ninth, tenth, eleventh, twelfth, or thirteenth invention, characterized in that the data is a record on a database system.

A fifteenth invention to solve the above problems is a data clustering program characterized by allowing a computer to execute: simple similarity calculation processing that divides a block containing at least one data based on a block generation condition; block division processing that repeatedly performs block division processing that allows the simple similarity calculation processing to divide the block by supplying the block and block generation condition thereto to create a hierarchical relationship between the blocks obtained by the block division processing; block storage processing that stores blocks and the hierarchical relationship between the blocks; similarity calculation processing that calculates the similarity between combinations of data contained in a block; and block integration processing that allows the similarity calculation section to calculate the similarity between combination of data contained in a block and executes processing for combining groups each of which contains at least one data based on the calculation result of the similarity calculation section along the hierarchical relationship between blocks stored in the block storage section.

A sixteenth invention to solve the above problems is the data clustering program according to the fifteenth invention, characterized in that when performing additional block division processing, the block division processing uses, as a new block generation condition, a block generation condition tighter than the original block generation condition.

A seventeenth invention to solve the above problems is the data clustering program according to the fifteenth or sixteenth invention, characterized in that the simple similarity calculation processing uses a method with a lower accuracy but with a lower calculation load to calculate the simple similarity between data, and the similarity calculation processing uses a method with a higher calculation load but with a higher accuracy to calculate the similarity between data.

An eighteenth invention to solve the above problems is the data clustering program according to the fifteenth, sixteenth, or seventeenth invention, characterized in that the block integration processing uses representative data of groups to allow the similarity to be calculated and determines whether the groups can be combined or not.

A nineteenth invention to solve the above problems is the data clustering program according to the seventeenth invention, characterized in that the similarity calculation processing determines "integration possible" "integration impossible" or "continuous check" as the result of the similarity calculation based on the similarity between the data combination and, when the result is "continuous check" and the data that have been subjected to the similarity calculation are represented data, calculates the similarity between combination of different data contained in the groups to which the representative data belong and determines "integration possible" or "integration impossible".

A twentieth invention to solve the above problems is the data clustering program according to the fifteenth, sixteenth, seventeenth, eighteenth, or nineteenth invention, characterized in that when moving to a new block along the hierarchical relationship between blocks, the block integration processing adds a check mark to a group containing only one data to exclude representative data of the group added with the check mark from the subsequent similarity calculation between the combination of data performed in the similarity calculation processing.

A twenty-first invention to solve the above problems is the data clustering program according to the fifteenth, sixteenth, seventeenth, eighteenth, nineteenth, or twentieth invention, characterized in that the data is a record on a database system.

By adopting the above configuration, data is divided into small-sized blocks while tightening a division condition in a stepwise manner and, afterward, the blocks are integrated while determining whether or not to allow the integration. Thus, it is possible to check starting from data combinations that are likely to be integrated, thereby reducing the number of combinations while maintaining accuracy. As a result, the first and second objects of the present invention can be achieved.

ADVANTAGES OF THE INVENTION

A first advantage is that it is possible to prevent the processing speed from decreasing while maintaining accuracy. Data is divided into small-sized blocks while tightening a division condition in a stepwise manner and, the blocks are integrated in the reverse order in which the data is divided into the blocks while determining whether or not to allow the integration. Thus, it is possible to check starting from data combinations that are likely to be integrated, thereby reducing the number of combinations while maintaining accuracy.

A second advantage is that it is possible to eliminate the need for the trial and error approach to the determination of parameters for the clustering. This is, data is divided into small-sized blocks while tightening a division condition in a stepwise manner, and the blocks are integrated in the reverse order in which the data is divided into the blocks while determining whether or not to allow the integration, which eliminates the need of previous determination of the level of a block generation condition in the rough narrowing-down method, which has been required in a conventional approach.

BRIEF DESCRIPTION OF THE DRAWINGS

FIG. 11 is a view showing an example of data registered in a database;

FIG. 12 is a view showing an example of a flowchart of operation according to the present invention;

FIG. 13 is a view showing an example of data divided by the block division section;

FIG. 14 is a view showing an example of data divided by the block division section;

EXPLANATION OF REFERENCE SYMBOLS

Figure 1:
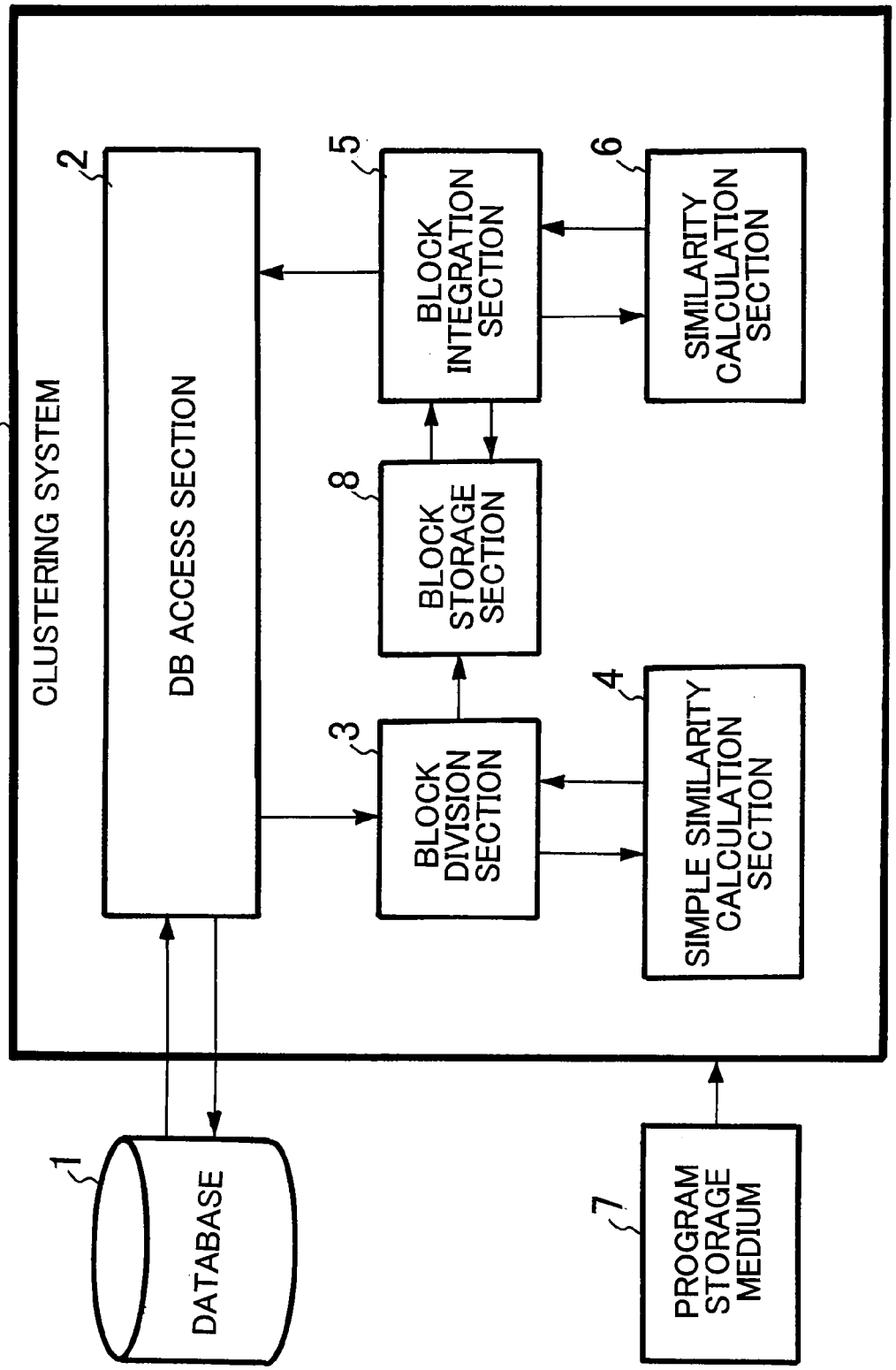
FIG. 1 is a block diagram showing a functional configuration of a first embodiment of the present invention.

1: Database
2: DB access section
3: Block division section
4: Simple similarity calculation section
5: Block integration section
6: Similarity calculation section
7: Program storage medium

BEST MODE FOR CARRYING OUT THE INVENTION

First Embodiment

A first embodiment of the present invention will be described in detail by referring to the accompanying drawings.

Hereinafter, "database" is sometimes referred to as "DB".

FIG. 1 is a block diagram of a preferred embodiment for practicing the present invention. A clustering system according to a preferred embodiment of the present invention includes a DB access section 2, a block division section 3, a simple similarity calculation section 4, a block integration section 5, a similarity calculation section 6 and a block storage section 8.

A target database 1 is so-called a database and stores a plurality of data. The database 1 may be a single database or a database obtained by virtually merging a plurality of databases.

The DB access section 2 performs data input/output from and to the target database 1. When reading data from the target database 1, the DB access section 2 combines the read data into one block supplies it to the block division section 3. The one block contains one or more data. When receiving information from the block integration section 5 to be described later, the DB access section 2 writes the received information in the target database 1.

Here, a description will be given of details of the block. In the present invention, terms "block" and "group" are used to represent one containing one or more data. The group is created through processing performed by the block integration section 5 and similarity calculation section 6 and contains one or more data. One of the data contained in the group is set as representative data. The block is constituted by one or more data, one or more groups, or combination thereof.

The block division section 3 divides a block received from the DB access section 2 into sufficiently small blocks. The block division processing is made by supplying the block and block generation condition to the simple similarity calculation section 4. Upon receiving the block and block generation condition, the simple similarity calculation section 4 generates blocks and returns them to the block division section 3 (details will be described later). The block division section 3 checks the returned blocks. If a supplied block is not sufficiently small, the block division section 3 supplies this block and a new block generation condition which is one step tighter than the original one to the simple similarity calculation section 4 for another block division processing.

The number of data belonging to one block is used as a criterion for determining whether the block is sufficiently small or not. For example, the block division section 3 does not determine so if the number of data belonging to a block is 20 or more. This determination may be made based on the ratio of the number of data belonging to a block relative to the number of all data. For example, if the number of data belonging to a block is 1% or more, the block is further divided. The determination is not limited to the above. The determination criterion may be input by a user, may be read from a setting file, or may previously be determined.

The block generation condition is specified, on a case-by-case basis, according to a method for calculating simple similarity. For example, a method for calculating the simple similarity as a numerical value may be used. In this case, a certain threshold value is set as the block generation condition, and a data combination having a similarity exceeding the threshold value is combined into the same block. In order to make the block generation condition one step tighter, a one step larger threshold value is used.

The simple similarity calculation section 4 receives the block and block generation condition from the block division section 3, calculates the simple similarity between data combinations contained in the block, generates blocks based on the calculation result and block generation condition, and returns the generated blocks to the block division section 3. At this time, the simple similarity calculation section 4 uses the rough narrowing-down method, i.e., a method with a higher processing speed but with a lower accuracy to calculate the simple similarity. A known method can be used for the calculation of the simple similarity.

Figure 2:
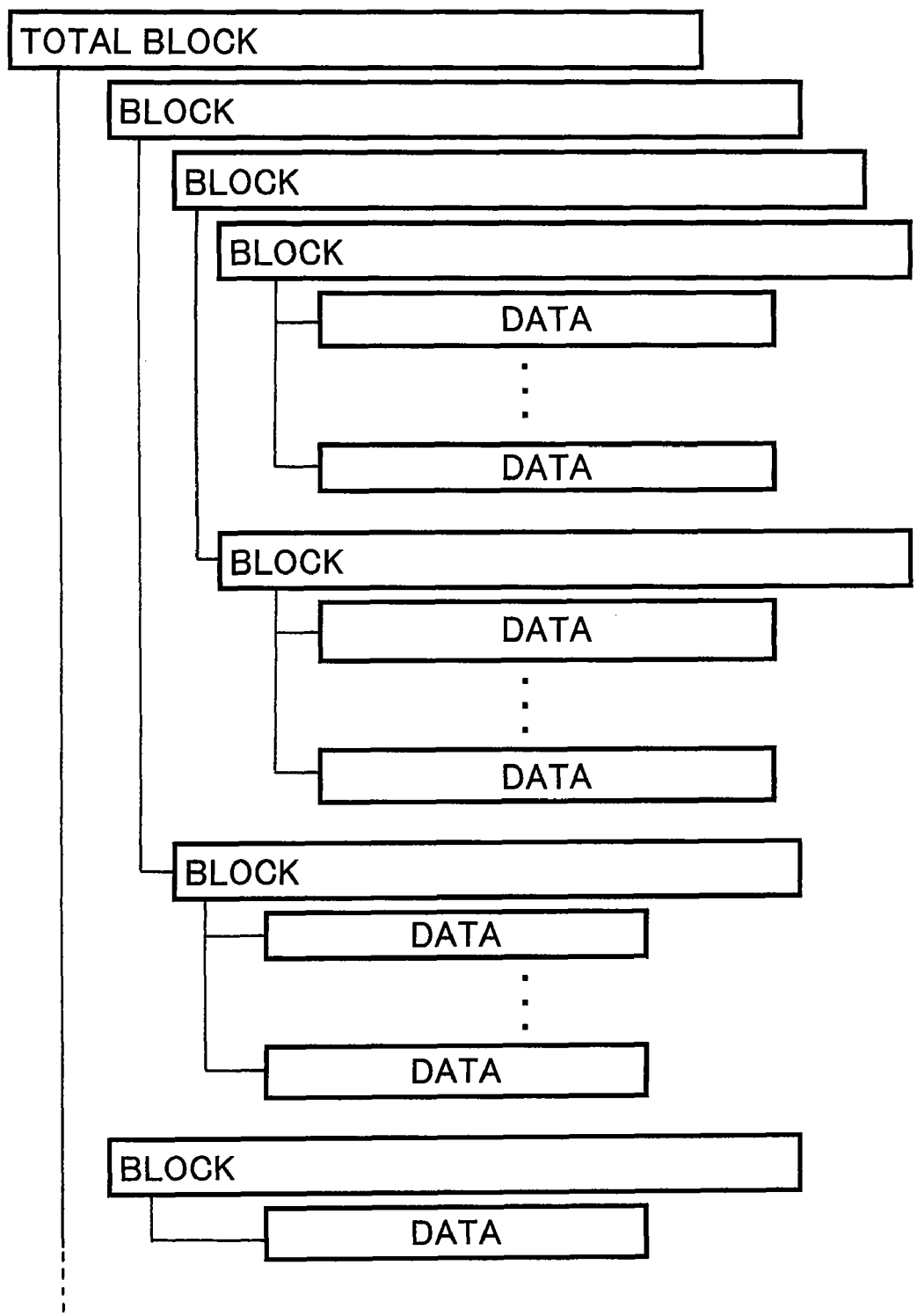
FIG. 2 is a view showing an example of a hierarchical relationship generated in the course of division processing performed by a block division section.

The block division section 3 stores a hierarchical relationship and blocks generated in the course of the division processing in the block storage section 8. FIG. 2 shows the hierarchical relationship generated in the course of the division processing. The block division section 3 repeatedly divides each block into sufficiently small blocks while tightening the block generation condition in a stepwise manner. Accordingly, as the hierarchy becomes deeper, the block generation condition becomes tighter.

Before explaining the details of the block integration section 5 and similarity calculation section 6, the "group" used in processing performed by the block integration section 5 and similarity calculation section 6 will here be described. As described above, a group contains one or more data, and one of the data contained in the group is set as representative data.

Various methods can be used to select the representative data. For example, data contained in a group are sorted by some sort of key, and data positioned at, e.g., the center or head is selected as the representative data. In the case where only one data is contained in a group, the one data is selected as the representative data. The selection of the representative data need not be made at the group formation time, but may be made at the time when the representative data is required for calculation.

The block integration section 5 integrates blocks and groups in the direction from a hierarchically deeper position to shallower position based on the hierarchical relationship between the blocks stored in the block storage section 8.

The block integration section 5 checks whether groups contained in a block can be integrated or not. To this end, the block integration section 5 supplies combinations of representative data belonging to the groups to the similarity calculation section 6. The similarity calculation section 6 calculates the similarity between the representative data. When determining that target groups can be integrated with each other, the similarity calculation section 6 returns "integration possible" to the block integration section 5; while when determining that target groups cannot be integrated, the similarity calculation section 6 returns "integration impossible". Upon receiving a result from the similarity calculation section 6, the block integration section 5 integrates the groups corresponding to the combination of representative data that has been determined to be "integration possible".

Figure 3:
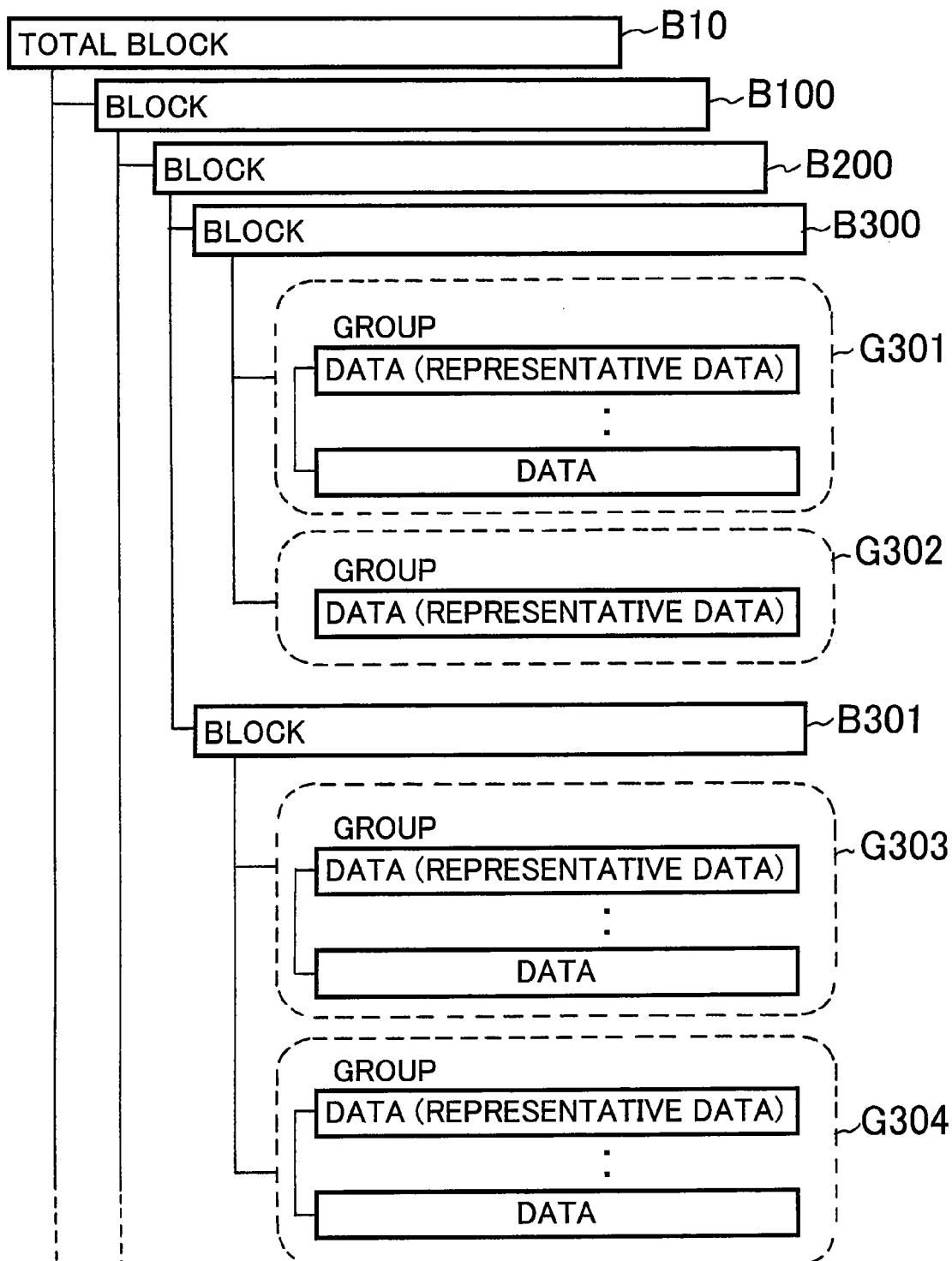
FIG. 3 is a view showing an example of a relationship between block, group, and data.
Figure 4:
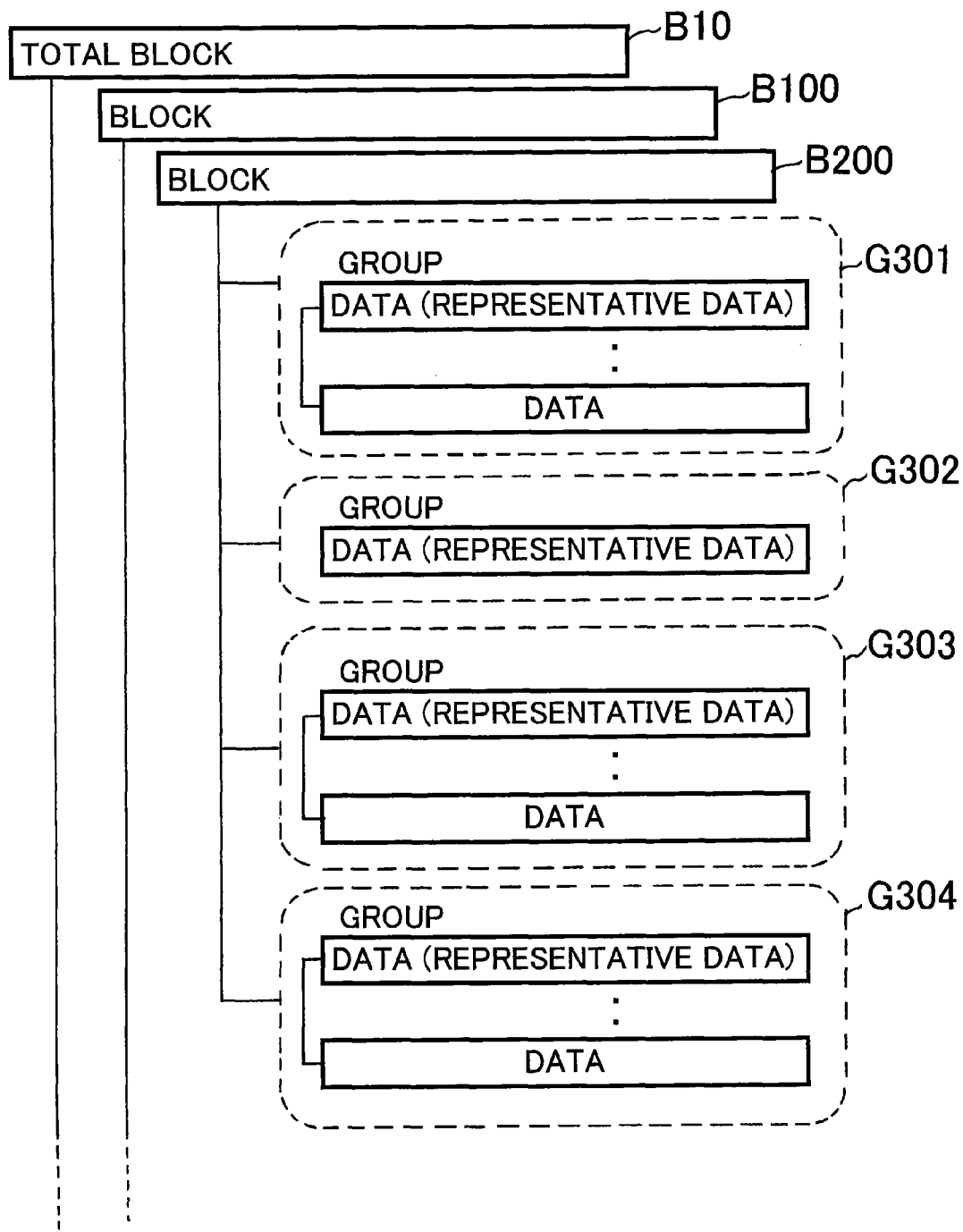
FIG. 4 is a view showing an example of a relationship between block, group, and data.

An example of the block integration processing performed by the block integration section 5 will be described with reference to FIGS. 3 and 4. FIG. 3 shows a relationship between the block, group, and data, in which a block B300 has groups G301 and G302 and block B301 has groups G303 and G304. The blocks B300 and B301 have a common parent block B200. After completion of the group formation processing in the blocks B300 and B301, the block integration section 5 integrates the blocks B300 and B301 into a block B200. Accordingly, the groups G301, G302, G303, and G304 belonging to the block B300 or B301 become child elements of the block B200 (FIG. 4). Afterward, the group integration section 5 supplies combinations of the representative data of the groups G301, G302, G303, and G304 to the similarity calculation section 6 so as to perform a group formation processing in the block B200.

The similarity calculation section 6 receives the data combinations from the block integration section 5, calculates the similarity between them, and determines whether integration of each data combination can be made or not. As described above, when determining that target groups can be integrated, the similarity calculation section 6 returns "integration possible" to the block integration section 5; while when determining that target groups cannot be integrated, the similarity calculation section 6 returns "integration impossible". At this time, the similarity calculation section 6 uses the detailed narrowing-down method, i.e., a method with a higher accuracy but with a lower processing speed to calculate the similarity. A known method, e.g., one using the edit distance, can be used for the calculation of the similarity. Operation of the similarity calculation section 6 will be described later.

At the time point when there exists no block to be integrated, the block integration section 5 ends the processing. The similar data integrated into a group at this time is regarded as a cluster.

The block storage section 8 stores the blocks supplied from the block division section 3 and hierarchical relationship between them. The block integration section 5 refers to the stored hierarchical relationship to perform the block integration processing and corrects the hierarchical relationship, on a case-by-case basis, at the time of the block integration.

Operation of the first embodiment will next be described.

Figure 5:
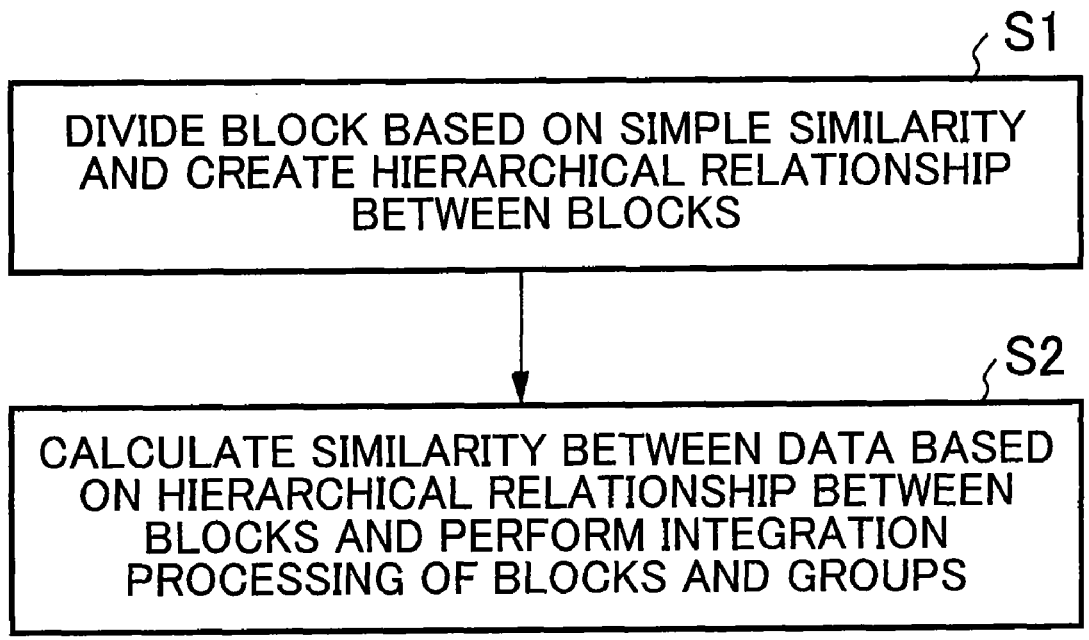
FIG. 5 is a view showing an example of a flowchart of operation of the first embodiment.

FIG. 5 is a flowchart showing operation of the first embodiment. The entire data read by the DB access section 2 is divided by the block division section 3 and obtained blocks are stored in the block storage section 8 together with a hierarchical relationship between the blocks (step S1). Subsequently, the block integration section 5 performs the integration processing of blocks and data while referring to the hierarchical relationship stored in the block storage section 8 (step S2).

Figure 6:
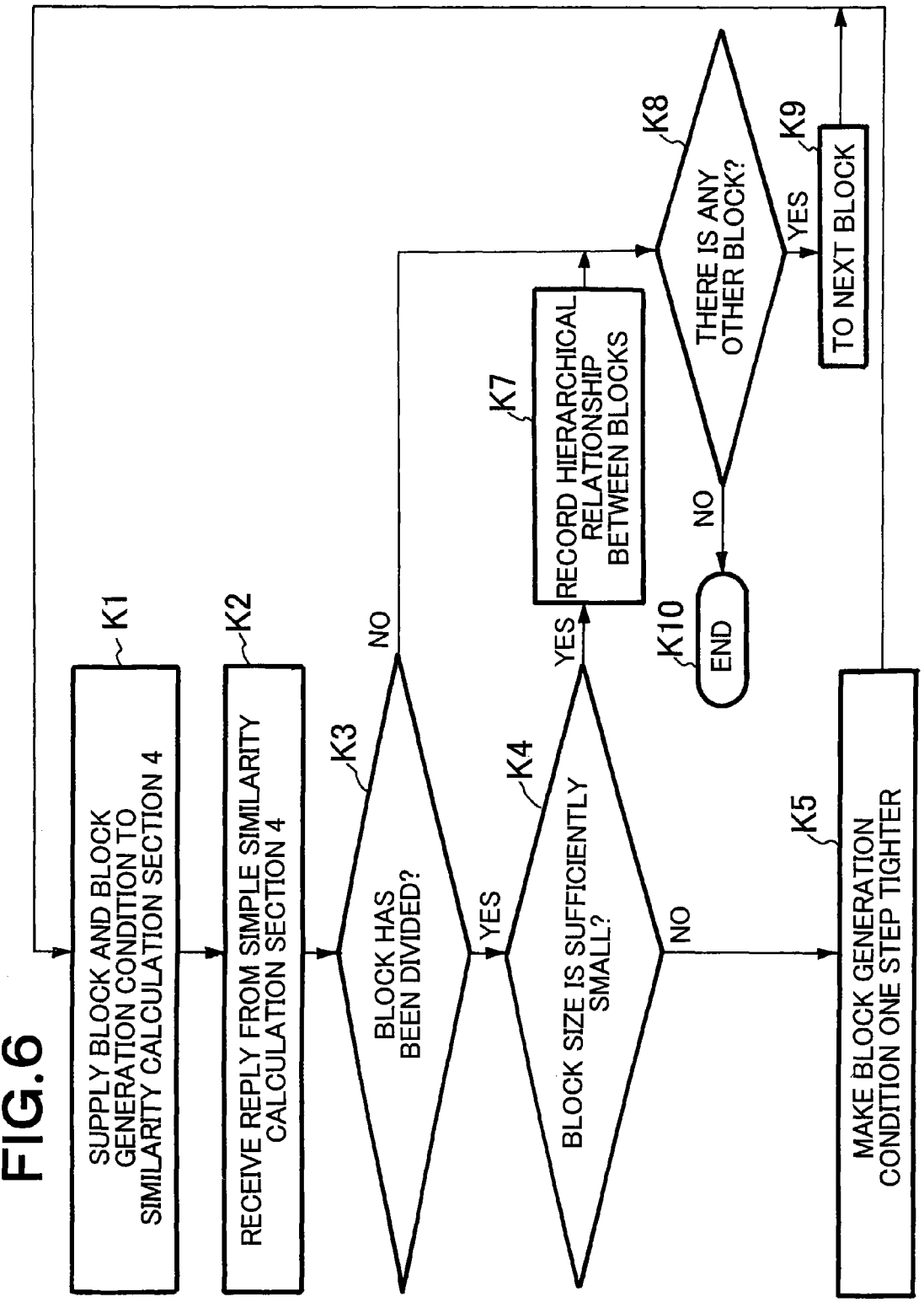
FIG. 6 is a view showing an example of a flowchart of operation of the block division section 3 in the first embodiment.

Next, with reference to FIG. 6, operation of the block division section 3 will be described. The block division section 3 specifies a target block and a block generation condition and allows the simple similarity calculation section 4 to divide the block (step K1). The simple similarity calculation section 4 generates, according to the block generation condition, one or more blocks from the supplied block and returns the generated blocks to the block division section 3 (step K2). Operation of the simple similarity calculation section 4 will be described later.

The block division section 3 checks the blocks returned from the simple similarity calculation section 4 and confirms whether the original block has been divided (step K3). When the block has been divided, the block division section confirms the size of each block (step K4). In the case where the size of one returned block is too large, the block division section 3 makes the block generation condition one step tighter (step K5) and supplies once again the one block and a new block generation condition to the simple similarity calculation section 4 (step K1). The block division section 3 repeats the above operation until the size of the block returned from the simple similarity calculation section 4 becomes sufficiently small. In the case where the size of one block is sufficiently small, the block division section 3 stores, as the hierarchical relationship between blocks, information indicating how the original block has been divided (step K7) and checks the size of another block (step K9). When there exists no block to be divided, the block division section 3 ends this processing (step K10).

Operation of the simple similarity calculation section 4 will next be described. The simple similarity calculation section 4 generates blocks from data belonging to the supplied block according to the block generation condition. For example, the simple similarity calculation section 4 combines a data group having a simple similarity with the data specified in the block generation condition, which exceeds a threshold value into one block. Alternatively, a data group that satisfies the block generation condition may be combined into one block. Further alternatively, data satisfying the block generation condition may be searched for from data belonging to the supplied block. If a new block needs to be generated at this time, the simple similarity calculation section 4 generates new one. Note that one data may belong to a plurality of blocks.

As described above, through the processing performed by the block division section 3 and simple similarity calculation section 4, a hierarchical relationship between blocks as shown in FIG. 2 is generated. The block division section 3 stores the hierarchical relationship and blocks in the block storage section 8. The block integration section 5 and similarity calculation section 6 integrates data in the order from a hierarchically deeper position based on the hierarchical relationship.

Figure 7:
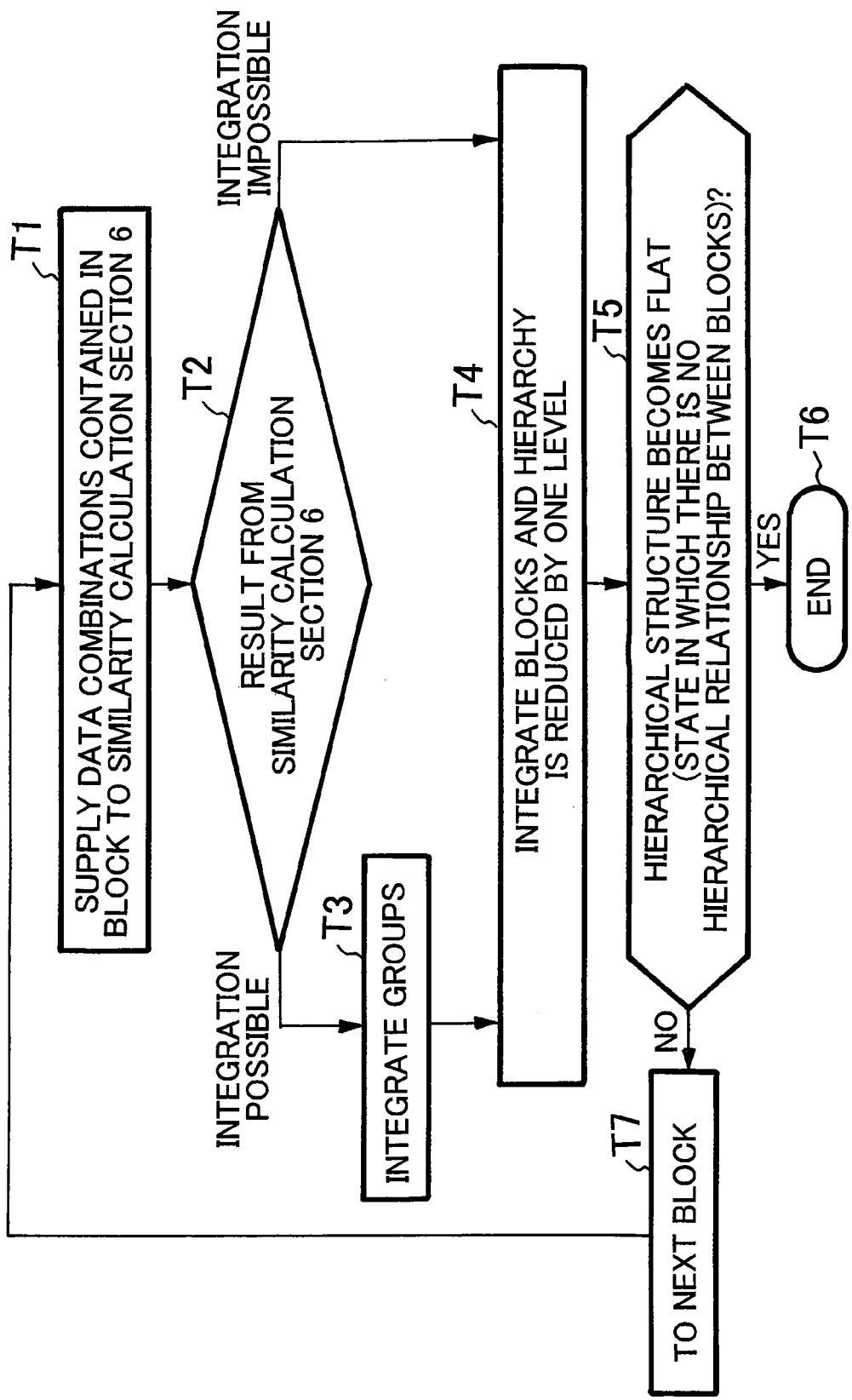
FIG. 7 is a view showing an example of a flowchart of operation of a block integration section 5 in the first embodiment.

FIG. 7 is a flowchart showing operation of the block integration section 5. The block integration section 5 supplies data combinations belonging to a target block to the similarity calculation section 6 (step T1). When the target block contains any group, representative data belonging to the group is used. For example, in the case of the block 200B of FIG. 4, the block integration section 5 supplies six combinations of the representative data belonging to groups G301, G302, G303, and G304.

Upon receiving a set of the data combinations, the similarity calculation section 6 calculates the similarity between each data combination and returns "integration possible" or "integration impossible" to the block integration section 5.

The block integration section 5 checks the result returned from the similarity calculation section 6 (step T2) and performs group formation processing based on the result. That is, when the result is "integration possible", the block integration section 5 integrates the relevant groups into one group (step T3).

After completion of the group formation processing for the target block, the block integration section 5 integrates blocks (step T4), and shifts to the processing for the next block (step T7). The block integration section 5 integrates blocks and groups in the direction from a hierarchically deeper position to shallower position based on the hierarchical relationship between blocks (as shown in FIG. 2) stored in the block storage section 8. When there is no hierarchical relationship between blocks, the block integration section 5 ends this flow (step T6).

After the completion of the above processing, the block integration section 5 supplies the group formation result to the DB access section 2. The DB access section 2 registers the received result in the database 1.

Figure 8:
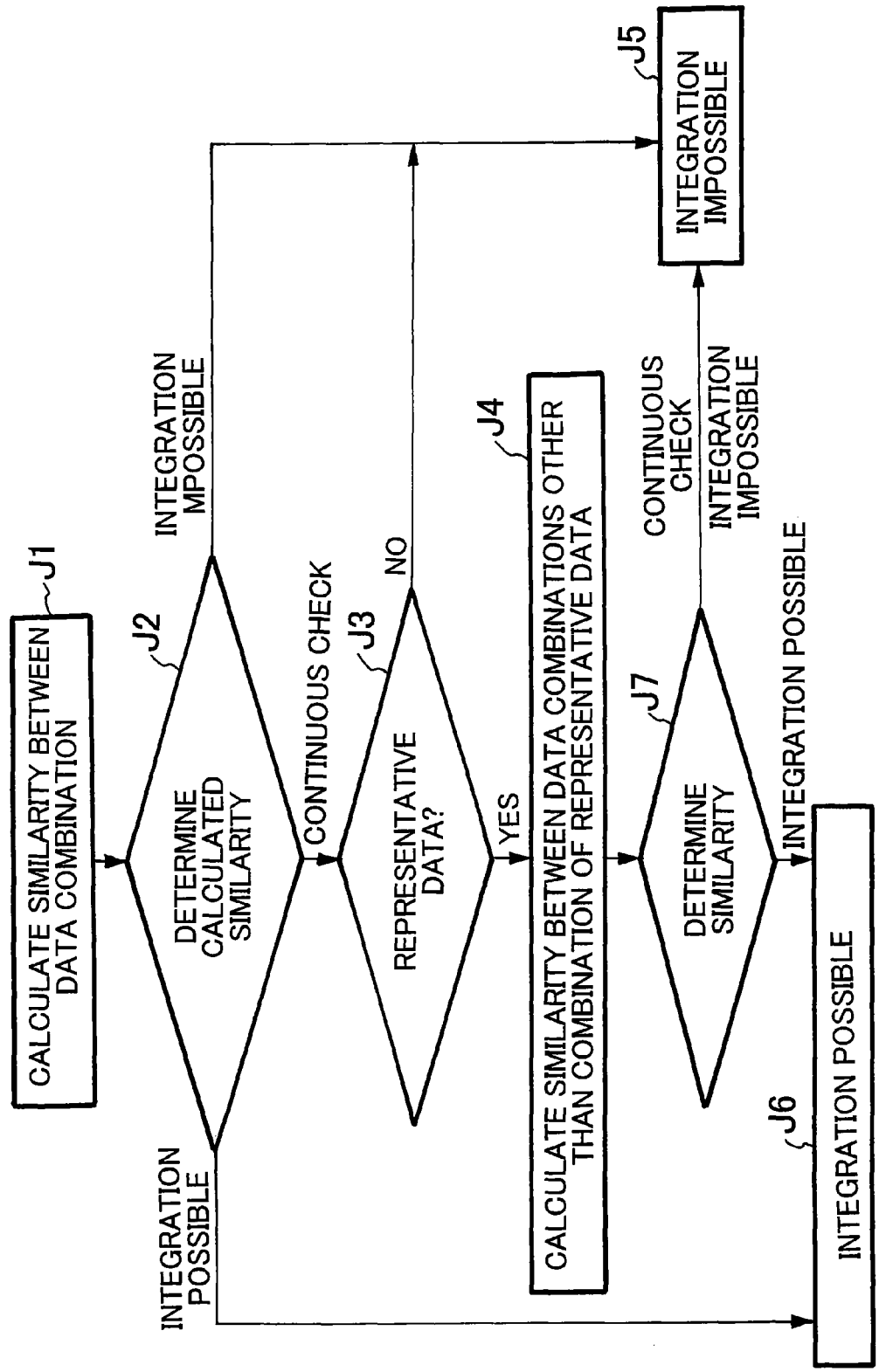
FIG. 8 is a view showing an example of a flowchart of operation of a similarity calculation section 6 in the first embodiment.

FIG. 8 shows an example of operation of the similarity calculation section 6. Upon receiving a set of data combinations from the block integration section 5, the similarity calculation section 6 calculates the similarity between each combination (step J1). Then, the similarity calculation section 6 classifies the calculation result into three groups: "integration possible", "continuous research", and "integration impossible" (step J2).

In the case where there is any data combination determined to be "continuous check", the similarity calculation section 6 checks whether the elements of the data combination are representative data or not (step J3). When determining that the elements of the data combination are representative data, the similarity calculation section 6 carries out a detailed check of whether groups containing the representative data can be integrated or not (step J4). That is, the similarity calculation section 6 calculates the similarity between all combinations of data contained in the groups. Then, the similarity calculation section 6 classifies the calculation result once again (step J7). In this manner, the similarity calculation section 6 calculates a results indicative of whether target groups including the representative data are "integration possible" or "integration impossible" and returns the result to the block integration section 5 (steps J5 and J6).

The block storage section 8 in the first embodiment is realized by, e.g., a semiconductor memory. The DB access section 2, block division section 3, simple similarity calculation section 4, block integration section 5, and similarity calculation section 6 may be realized by a hardware having the respective functions, or by a computer operating according to, e.g., a data clustering program. In this case, the data clustering program is provided by means of a computer readable medium such as a magnetic disk or semiconductor memory and read by the computer at its start-up time, allowing the computer to operate according to the data clustering program to thereby function as the DB access section 2, block division section 3, simple similarity calculation section 4, block integration section 5, and similarity calculation section 6.

As described above, according to the first embodiment, the block division section 3 hierarchically divides each block while tightening the block generation condition in a stepwise manner, and the block integration section 5 integrates blocks and groups in the direction from a hierarchically deeper position to shallower position while determining whether integration of each group set can be made or not. Only when a detailed check is required, the similarity between combinations of data contained in target groups is calculated. Thus, it is possible to perform the check starting from data combinations that are likely to be integrated and to omit the calculation of combinations for which a detailed check is not required. Therefore, it is possible to reduce the number of combinations while maintaining clustering accuracy.

When the rough narrowing-down method and detailed narrowing-down method are used in combination in a conventional approach, it is difficult to determine a threshold value for narrowing down the records, which involves trial and error process. On the other hand, in the present invention, each block is divided while tightening the block generation condition in a stepwise manner, and, based on the obtained hierarchical relationship between blocks, blocks and groups are integrated while determining whether integration of each group set can be made or not. This eliminates the need for the trial and error approach to the determination of a threshold value for narrowing down the records in the rough narrowing-down method.

Further, when performing detailed check for combinations determined to be "continuous check", the block integration section 5 need not check combinations of all data belonging to two target groups but may skip further check if there is any combination having a similarity exceeding a set similarity threshold value. Further, since a high similarity value can be expected within one group, a method that mutually checks combinations of the representative data in one group and all data contained in other group can be adopted. This further reduces the number of combinations whose similarity is to be calculated and prevents the processing speed from decreasing.

Second Embodiment

Figure 9:
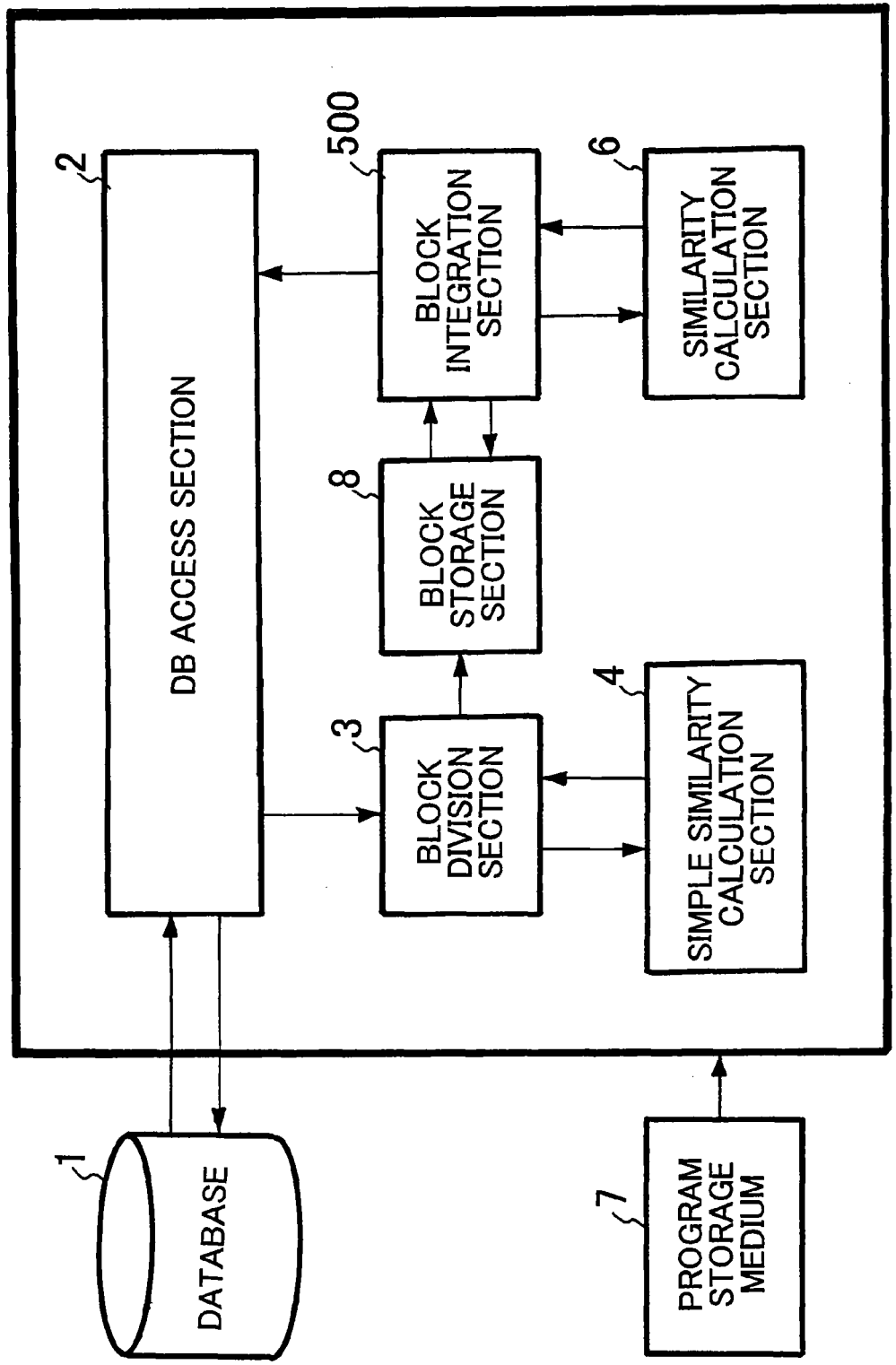
FIG. 9 is a block diagram showing a functional configuration of a second embodiment of the present invention.

FIG. 9 is a block diagram showing a configuration of a second embodiment of the present invention. In FIG. 9, the same reference numerals as those in FIG. 1 denote the same parts as those the first embodiment, and the descriptions thereof will be omitted here. The second embodiment differs from the first embodiment shown in FIG. 1 in that a block integration section 500 is provided in place of the block integration section 5.

In the second embodiment, "check mark" can be added to a group. The "check mark" is not added when a new group is generated but added in the course of the processing performed by the block integration section 500.

Figure 10:
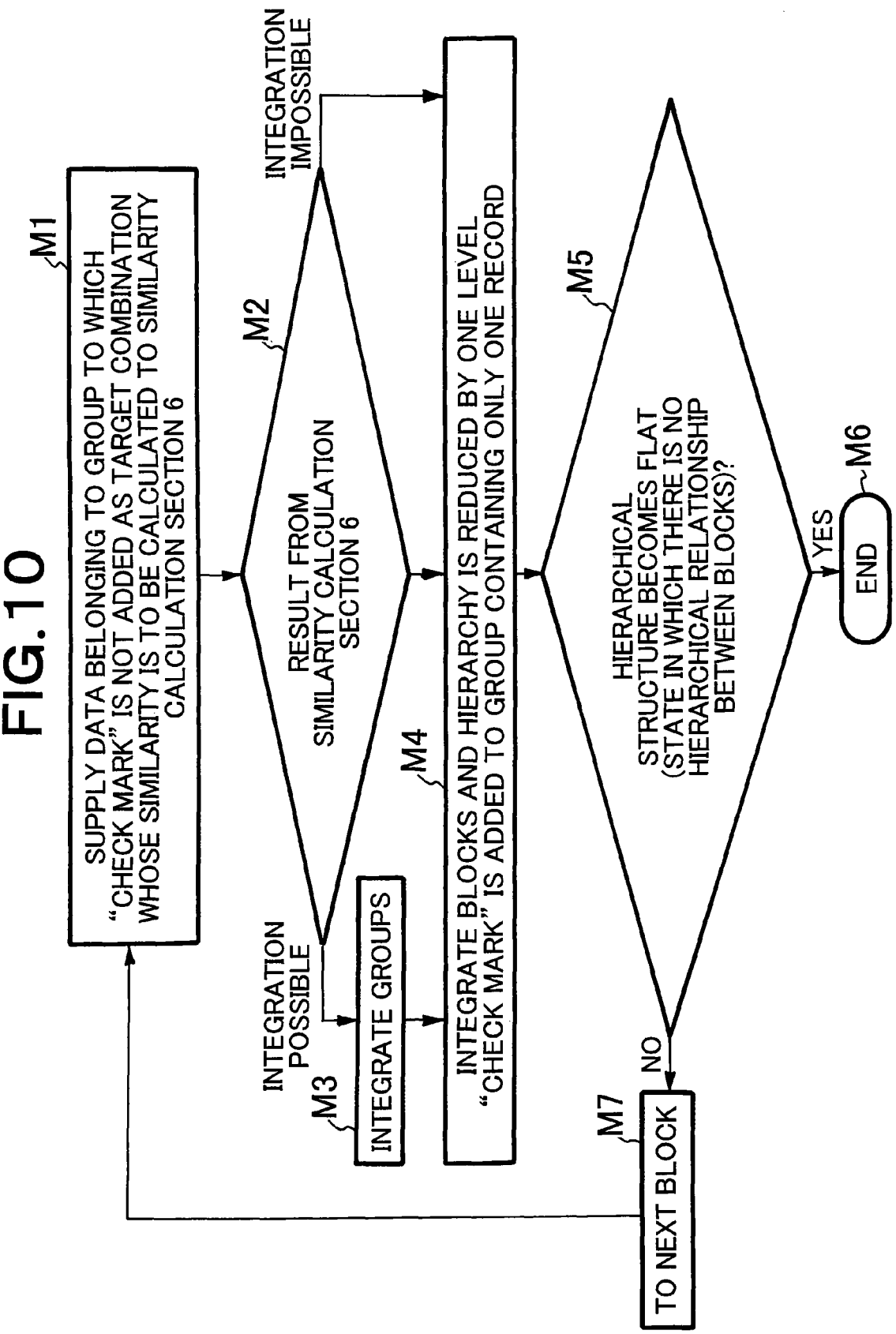
FIG. 10 is a view showing an example of a flowchart of operation of the block integration section 5 in the second embodiment.

Operation of the block integration section 500 will be described with reference to FIG. 10. The operation of the block integration section 500 greatly differs from that of the block integration section 5 of the first embodiment in that it uses the "check mark" in steps M1 and M4. That is, when integrating blocks to reduce a hierarchy level, the block integration section 500 checks the number of data contained in each of the groups to be integrated and adds the "check mark" to the group containing only one data. When the block integration section 500 checks the similarity between data combinations afterward, it skips the similarity calculation for the group added with the "check mark" (step M1).

According to the second embodiment of the present invention, the block integration section 500 adds "check mark" to the group containing only one data in the course of the block integration processing and skips the similarity calculation between combinations of the data in the group added with "check mark" and representative data of another group. As the hierarchical position becomes shallower, the block division condition set in the block division section 3 becomes looser, so that the similarity between data to be integrated next and data contained in the block obtained after one block integration processing is low. Therefore, even if the similarity calculation with the data to be integrated next is omitted in the course of block integration processing, clustering accuracy is not degraded, but, conversely, it is possible to significantly reduce the number of combinations whose similarity is to be checked and thereby to reduce the processing time.

A group to which the "check mark" is to be added need not be a group which has not been integrated by the integration processing performed across one or more hierarchies, but may be a group which has not been integrated by the integration processing performed across two or more, or, three or more hierarchies. Such a condition need not previously be determined but may be input by a user or may be read from a setting file.

Example

A first example of the present invention will be described below with reference to the accompanying drawings. The following example corresponds to the first embodiment of the present invention.

In the present example, data is stored in a database shown in FIG. 11. The database shown in FIG. 11 has three fields of ID, name, and address and holds 1,000 records. Clustering processing for duplicated records is performed according to a procedure shown in FIG. 12.

The simple similarity calculation section 4 in the present example uses NAME field and ADDRESS field to calculate the simple similarity. However, the database and field to be used for the simple similarity calculation may be determined and input by a user, or may be read from a setting file. Concretely, all fields may be used for the calculation or only predetermined fields such as NAME, ADDRESS, and PHONE NUMBER may be used.

Further, as described in the first embodiment, a known method may be used for the simple similarity calculation. In the present example, a method that combines records whose first some characters coincide with one another into a block.

With this method, there generated a block containing records whose first one character of the NAME field coincide with one another, a block containing records whose first one character of the ADDRESS field coincide with one another, and the like. Note that one record may be contained in a plurality of different blocks.

The DB access section 2 reads a database as shown in FIG. 11 from the database 1 and supplies as one block to the block division section 3. The block division section 3 supplies the received block and a block generation condition to the simple similarity calculation section 4. The simple similarity calculation section 4 returns generated blocks to the block division section 3.

The block generation condition in the present example is, e.g., "coincidence of first one character of NAME field" or "coincidence of first one character of ADDRESS field". The block generation condition may differ depending on the simple similarity calculation method.

As shown in FIG. 13, the simple similarity calculation section 4 in the present example generates blocks such as a block containing records whose first one character of NAME field is "A", a block containing records whose first one character of NAME field is "D", and a block containing records whose first one character of ADDRESS field is [O] or [DAI] (corresponding to one a single Japanese kanji symbol) and returns the generated blocks to the block division section 3.

The block division section 3 checks whether the size of each of the blocks returned from the simple similarity calculation section 4 is sufficiently small. It is assumed, in the present example, that a block containing 100 or more records should be further divided. That is, in the present example, the block division section 3 checks the number of records contained in each block returned from the simple similarity calculation section 4 and supplies once again a block containing 100 or more records, if exists, to the simple similarity calculation section 4 together with a block generation condition that has been tightened by one step. The simple similarity calculation section 4 returns blocks obtained by dividing the supplied block to the block division section 3. The block generation condition that has been tightened by one step is, e.g., "coincidence of first two characters of the current filed" or "coincidence of first one character of another field", and the like. How the condition is made tighter may be input by a user, may be read from a setting file, or may previously be determined.

In the case where the block cannot be divided any more even if the block division condition is made one step tighter, the condition is further tightened. In the case where the block cannot still be divided, the simple similarity calculation section 4 notifies the block division section 3 of information indicating that the supplied block cannot be divided no more to prevent the block division section 3 from trying to divide the current block. A case where the block cannot be divided no more even if the block division condition is made tighter is, e.g., "complete coincidence of values of the current field", "complete coincidence of values of all fields", and the like.

It is assumed, for example, that a block "one character of ADDRESS field is [O] or [Dai]" has 111 records. The block division section 3 supplies block generation conditions "block containing records whose first one character of ADDRESS field is [O] or [Dai]" and "coincidence of first two characters of ADDRESS field" to the simple similarity calculation section 4, and the simple similarity calculation section 4 returns blocks obtained by dividing the supplied block to the block division section 3. If the block cannot be divided, (that is, all the records in the block belongs to the same block) under the block generation condition "coincidence of first two characters of ADDRESS field", the block generation condition is made tighter in a stepwise manner ("coincidence of first three characters of ADDRESS field", "coincidence of first four characters of ADDRESS field", . . . ). It is assumed, for example, that in the case where the block is divided under a block generation condition "coincidence of first two characters of ADDRESS field", a block containing 110 records whose first two characters of ADDRESS field is [O-saka] (the number of phrases separated by hyphens correspond to the number of characters) and block containing 1 record whose first two characters of ADDRESS field is [Dai-tou] are obtained. Since the block containing 110 records whose first two characters of ADDRESS field is [O-saka] satisfies the block generation condition specifying that a block containing 100 or more records should be further divided, it is further divided. It is assumed, for example, that the block is divided under the condition "coincidence of first three characters of ADDRESS field", a block containing 101 records whose first three characters of ADDRESS field is [O-saka-hu] and block containing 9 records whose first three characters of ADDRESS field is [O-saka-shi] are obtained. Since the block containing 101 records whose first three characters of ADDRESS field is [O-saka-hu] satisfies the block generation condition specifying that a block containing 100 or more records should be further divided, it is further divided. For example, in the case where the block cannot be divided under a block generation condition "coincidence of first four characters of ADDRESS field", the block is then divided under a block generation condition "coincidence of first five characters of ADDRESS field". It is assumed that the block containing 101 records whose first three characters of ADDRESS field is [O-saka-hu] is divided into a block containing 90 records whose first four characters of ADDRESS field is [O-saka-hu-o] (e.g., data representing "O-saka-hu-o-saka-shi") and a block containing 11 records whose first characters of ADDRESS field is [O-saka-hu-mori-guchi-shi] (e.g., data representing "O-saka-hu-mori-guchi-shi"). In this manner, the block containing 111 records whose first one character of ADDRESS field is [O] or [Dai] is divided into the block containing 90 records whose first four characters of ADDRESS field is [O-saka-hu-o], block containing 11 records whose first characters of ADDRESS field is [O-saka-hu-mori], block containing 9 records whose first three characters of ADDRESS field is [O-saka-shi], and block containing 1 record whose first two characters of ADDRESS field is [Dai-tou], as shown in FIG. 14.

Figure 15:
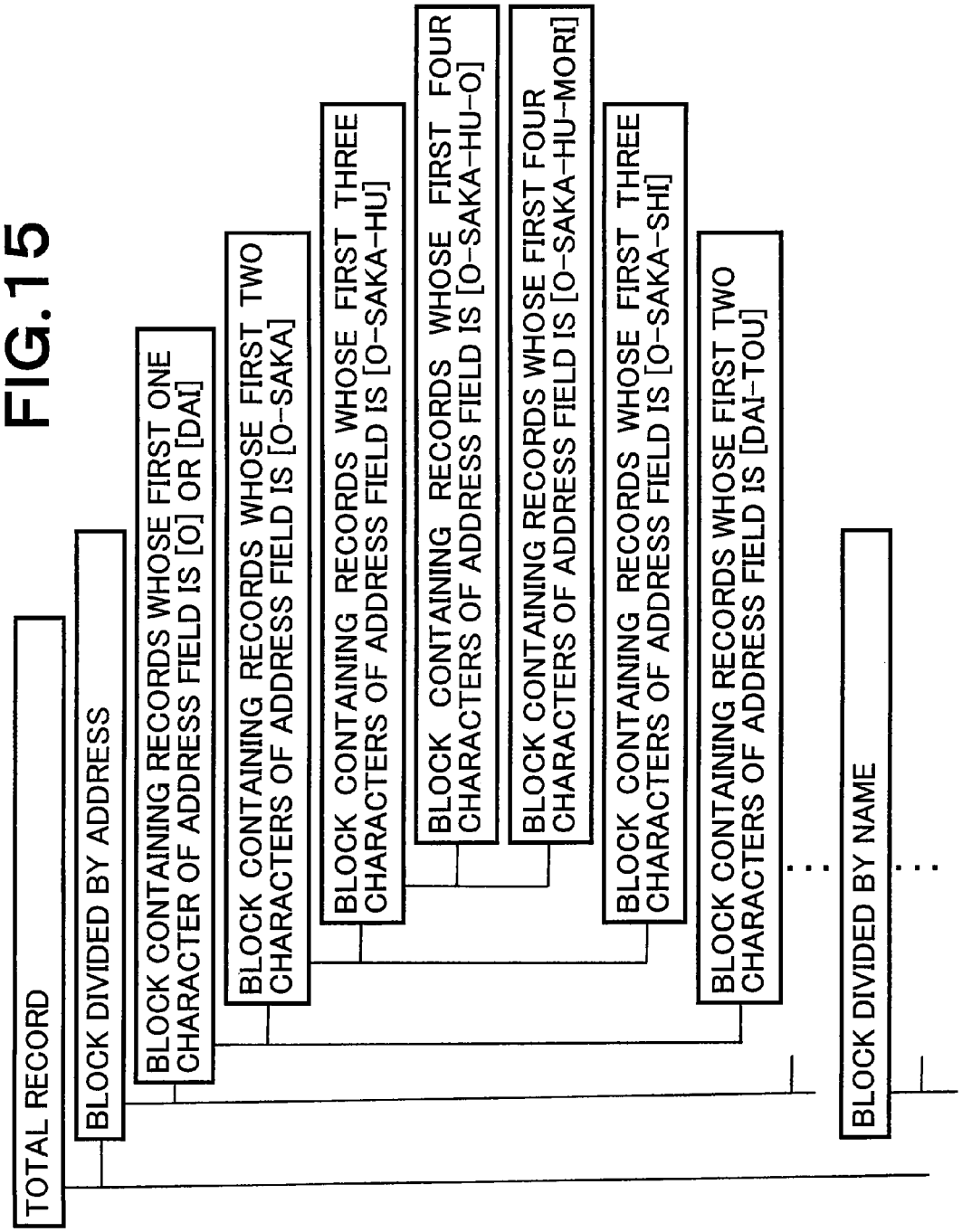
FIG. 15 is a view showing an example of data retaining information indicating data division processing performed by the block division section.

The block division section 3 stores, as the hierarchical relationship between blocks, information indicating how the original block has been divided in the block storage section 8. For example, the information has a tree structure as shown in FIG. 15. Each element of the tree structure stores information indicating the records contained in each block thereof. Such a block storage section 8 is realized by, e.g., a semiconductor memory.

After completion of the block division processing performed by the block division section 3, the block integration section starts its processing. The block integration section 5 supplies combinations of records belonging to each of the blocks stored in the block storage section 8 to the similarity calculation section 6. The similarity calculation section 6 calculates the similarity between the received records. If the calculated similarity exceeds a threshold value, the similarity calculation section 6 notifies the block integration section 5 that the received records belong to the same group.

Various methods including one using the edit distance are known as a calculation method of the similarity. In this example, any of the methods is used to calculate the similarity according to the procedure as described above. The threshold value may be input by a user, may be read from a setting file, or may previously be determined. Every time the similarity of one combination has been calculated, the similarity value or information indicating that the similarity thereof does not exceed the threshold value is recorded so as not to perform the same calculation afterward.

It is assumed that if the similarity between a record whose ID is 001 and record whose ID is 002 exceeds the threshold value and similarity between the record whose ID is 002 and record whose ID is 003 exceeds the threshold value, the records 001, 002, and 003 are determined to belong to the same group even if the similarity between the record 001 and record 003 does not exceed the threshold value.

For simplification, the following description will focus on a group contained in the block "first four characters of ADDRESS field is [O-saka-hu-o]" in the tree structure shown in FIG. 15. Numbers 1 to 90 are temporarily assigned for explanation to 90 records contained in the block "first four characters of ADDRESS field is [O-saka-hu-o]". Similarly, numbers 91 to 101 are assigned to 11 records contained in the block "first four characters of ADDRESS field is [O-saka-hu-mori]", numbers 102 to 110 are assigned to 9 records contained in the block "first three characters of ADDRESS field is [O-saka-shi]", and number 111 is assigned to 1 record contained in the block "first two characters of ADDRESS field is [Dai-tou]" (details of these blocks are shown in FIG. 14).

Here, a description is given of the processing in the block "first four characters of ADDRESS field is [O-saka-hu-o]". It is assumed that records 1 to 70 can be combined into one group. Similarly, in the block "first four characters of ADDRESS field is [O-saka-hu-mori]", records 91 to 95 can be combined into one group. Each of other records is assumed to constitute one group.

Figure 16:
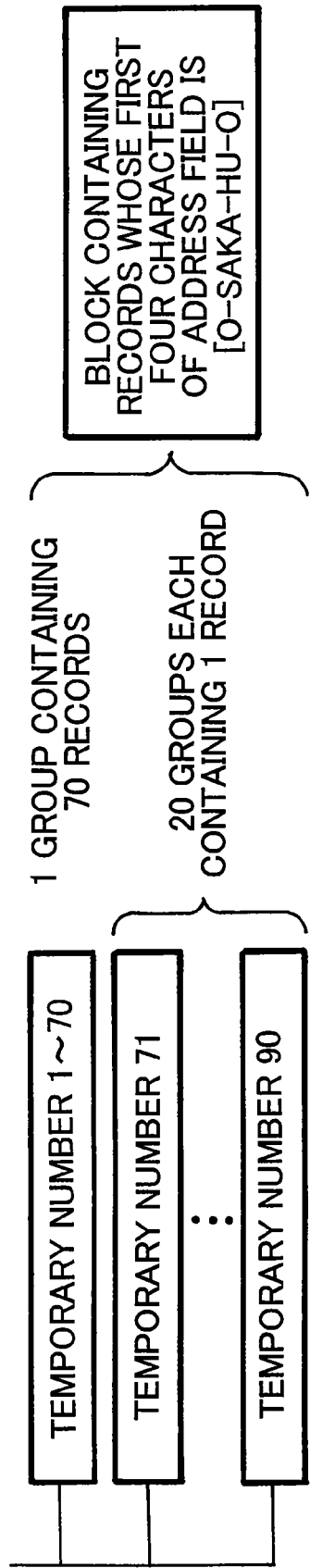
FIG. 16 is a view showing an example of divided data integration processing performed by the block integration section.
Figure 17:
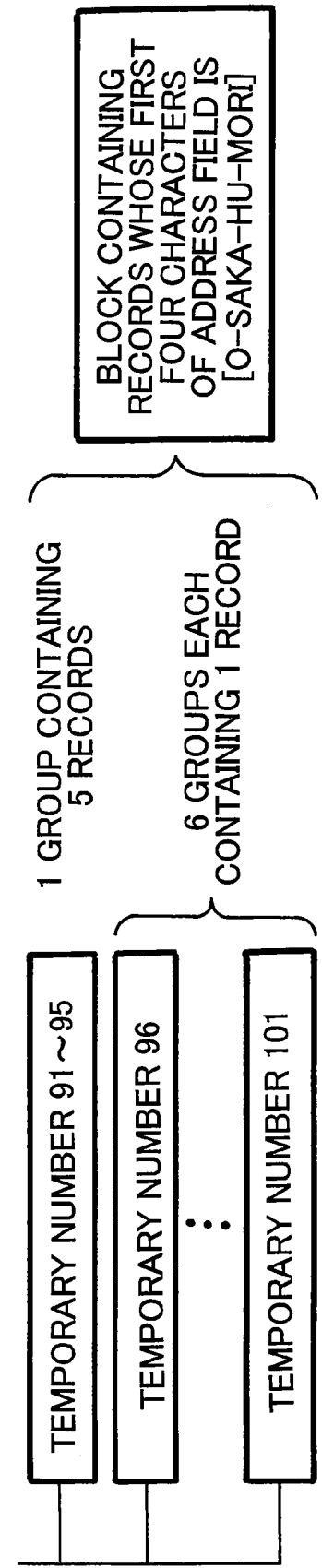
FIG. 17 is a view showing an example of divided data integration processing performed by the block integration section.

The block integration section 5 supplies combinations of records 1 to 90 (combination of records 1 and 2, combination of records 2 and 3, . . . ) in the block "first four characters of ADDRESS field is [O-saka-hu-o]" to the similarity calculation section 6 for the similarity calculation. The similarity calculation section 6 returns information indicating whether the received records belong to the same group to the block integration section 5. In the case of the block "first four characters of ADDRESS field is [O-saka-hu-o]", the similarity calculation section 6 returns information indicating that the records 1 to 70 can be combined into one group by respectively determining that records 1 and 2 can be combined into the same group, records 2 and 3 can be combined into the same group, . . . . Similarly, in the case of the block "first four characters of ADDRESS field is [O-saka-hu-mori]", the similarity calculation section 6 returns information indicating that the records 91 to 95 can be combined into one group by respectively determining that records 91 and 92 can be combined into the same group, records 92 and 93 can be combined into the same group, . . . . The block integration section 5 acquires such information to combine the records belonging to the block "first four characters of ADDRESS field is [O-saka-hu-o]" into 21 groups as shown in FIG. 16 and combines the records belonging to the block "first four characters of ADDRESS field is [O-saka-hu-mori]" into 7 groups as shown in FIG. 17.

After the group formation, the block integration section 5 selects a representative record for each group. Any method may be used for selecting the representative record. For example, records contained in a duplication candidate group are sorted by some sort of key, and a record positioned at, e.g., the center or head is selected as the representative record. In the case where only one record is contained in a group, the one record is selected as the representative record. It is assumed here that a record 1 is selected as the representative record from the group containing records 1 to 70, and record 91 is selected as the representative record from the group containing records 91 to 95. In other groups, each of which contains only one record, the one record itself serves as the representative record.

The block integration section 5 supplies a combination of the representative records to the similarity calculation section 6 so as to check whether target groups can be integrated or not. The similarity calculation section 6 calculates the similarity between the representative records to determine whether the calculated similarity exceeds the threshold value and returns the determination result to the block integration section 5.

Figure 18:
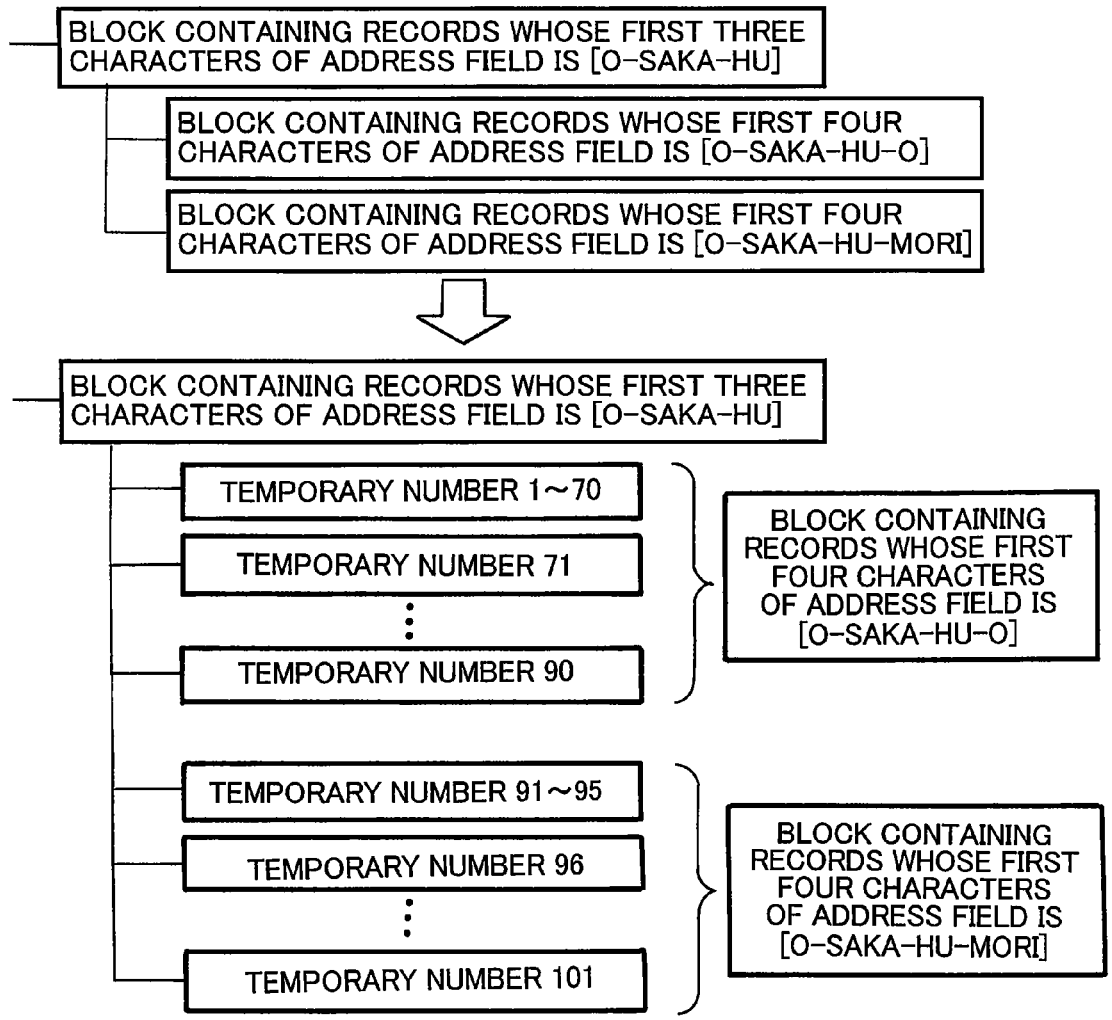
FIG. 18 is a view showing an example of divided data integration processing performed by the block integration section.

After completing the abovementioned processing for the block "first four characters of ADDRESS field is [O-saka-hu-o]" and block "first four characters of ADDRESS field is [O-saka-hu-mori]", the block integration section 5 integrates the above blocks and shifts to the integration processing for their parent block in the tree structure, i.e., a block "first three characters of ADDRESS field is [O-saka-hu]". Assuming that the block "first four characters of ADDRESS field is [O-saka-hu-o]" is as shown in FIG. 16 and block "first four characters of ADDRESS field is [O-saka-hu-mori]" is as shown in FIG. 17, the two blocks are integrated and the block "first three characters of ADDRESS field is [O-saka-hu]" as shown in FIG. 18 is obtained. In the processing for the block "first three characters of ADDRESS field is [O-saka-hu]", the block integration section 5 supplies combinations that have not been calculated among 28 (21+7) records to the similarity calculation section 6.

As described above, the block integration section 5 integrates blocks in the order from a deeper position in the tree structure. As the hierarchical position becomes shallower, the block division condition set in the block division section 3 becomes looser. Thus, as for a group that has not been integrated across, e.g., two or more hierarchies and has still only one record in the course of the block integration processing, it is possible to skip similarity calculation with the representative record of another group.

The above condition is not limited to two or more hierarchies, but may be one or more hierarchies or three or more hierarchies, and need not previously be determined but may be input by a user and may be read from a setting file. By skipping the similarity calculation for the group containing only one record, it is possible to significantly reduce the number of combinations to be checked, thereby reducing the processing time. In fact, there is a fear that a combination supposed to be combined into the same group may be ignored to reduce clustering accuracy. However, the similarity calculation is carried out in the order from a hierarchically deeper position, i.e., in the order from combinations under the tighter block division condition, so that accuracy equivalent or superior to the conventional method in which the rough narrowing-down method and detailed narrowing-down method are used in combination can be expected.

Here, assume a case where a given group has become a group containing only one record in the course of the integration processing performed on the ADDRESS field and similarity check with the representative record of another group is skipped. In this case, if the record is supposed to be contained in a duplicate candidate group with another record, it is likely that two records are combined into the same group in the course of the integration processing performed on, e.g., the NAME field. Therefore, it is believed that accuracy is not degraded when the similarity calculation for the group containing only one record is skipped.

The block integration section 5 combines groups into one when the similarity between the representative records thereof exceeds the threshold value. However, it is likely that even if the similarity between one combination of represented records does not exceed the threshold value, the similarity between another combination of records in the same group may exceed the threshold value. Any combination of records whose similarity exceeds the threshold value is supposed to exist within a group. In most cases, a value of the similarity is believed to be comparatively large, if not exceed, in every combination of the records within a group. Therefore, in the case where the similarity between the representative records does not exceed the threshold value, a detailed check is carried out than only when the similarity value thereof is comparatively large. This comparatively large value serving as a lower similarity threshold value may be input by a user, may be read from a setting file, or may previously be determined. For example, the lower similarity threshold value may be determined by doubling the margin of the similarity threshold value. More specifically, assuming that the similarity value ranges from 0 to 100 and that the similarity threshold value is 90, the margin of the threshold value is 10. Then, the margin of the threshold value is increased to 20, whereby the lower similarity threshold value is set to 80. The level of the margin may be input by a user, may be read from a setting file, or may previously be determined.

In order to check whether groups can be integrated or not, the block integration section 5 supplies combinations of representative records belonging to the groups to the similarity calculation section 6. The similarity calculation section 6 calculates the similarity between the representative records so as to determine whether the similarity between them exceeds the threshold value. When the similarity does not exceed the threshold value but has a comparatively large value, the similarity calculation section 6 determines that it is likely that the representative records may be combined into the same group and calculates the similarity between combinations of all records contained in the two groups to which the representative records belong.

At this time, the similarity calculation section 6 need not check combinations of all records in the two groups but may end the processing if there is any combination whose similarity exceeds the threshold value. Further, since a high similarity value can be expected within one group, a method that mutually checks combinations of the representative record in one group and all records contained in other group can be adopted. Further, the following configuration may be adopted, wherein: when the similarity does not exceed the threshold value but has a comparatively large value, the similarity calculation section 6 returns information indicating that it is likely that representative records may be combined into the same group; and upon receiving the information, the block integration section 5 supplies combinations of all records in two groups to which the representative records belong to the similarity calculation section 6.

After completion of the block integration processing in the manner as described above, the block integration section 5 registers an obtained result in the database 1 through the DB access section 2. The result may be interpreted as duplicate records and registered in the database 1 by overwriting the original database, or may be registered as a new database.

The invention claimed is:

1. A data clustering computer system comprising:
   a simple similarity calculation section of said computer system that receives a block containing at least one data and a block generation condition and divides the block based on the block generation condition;
   a block division section of said computer system that repeatedly performs block division processing that allows the simple similarity calculation section to divide the block by supplying the block and block generation condition thereto to create a hierarchical relationship between the blocks obtained by the block division processing;
   a block storage section of said computer system that stores blocks and the hierarchical relationship between the blocks;
   a similarity calculation section of said computer system that calculates the similarity between combinations of data contained in a block; and
   a block integration section of said computer system that allows the similarity calculation section to calculate the similarity between combination of data contained in a block and executes processing for combining groups each of which contains at least one data based on the calculation result of the similarity calculation section along the hierarchical relationship between blocks stored in the block storage section,
   the block integration section uses representative data of groups to allow the similarity to be calculated and determines whether the groups can be combined or not; and
   the similarity calculation section determines "integration possible" "integration impossible" or "continuous check" as the result of the similarity calculation based on the similarity between the data combination and, when the result is "continuous check" and the data that have been subjected to the similarity calculation are represented data, calculates the similarity between combination of different data contained in the groups to which the representative data belong and determines "integration possible" or "integration impossible".

2. The data clustering system according to claim 1, characterized in that
   when performing additional block division processing, the block division section uses, as a new block generation condition, a block generation condition tighter than the original block generation condition.

3. The data clustering system according to claim 1, characterized in that
   the simple similarity calculation section uses a method with a lower accuracy but with a lower calculation load to calculate the simple similarity between data, and
   the similarity calculation section uses a method with a higher calculation load but with a higher accuracy to calculate the similarity between data.

4. The data clustering system according to claim 1, characterized in that
   when moving to a new block along the hierarchical relationship between blocks, the block integration section adds a check mark to a group containing only one data to exclude representative data of the group added with the check mark from the subsequent similarity calculation between the combination of data performed by the similarity calculation section.

5. The data clustering system according to claim 1, characterized in that
   the data is a record on a database system.

6. A data clustering method on a computer system, comprising:
   the computer system:
   a) repeatedly performing block division processing that divides a block containing at least one data based on a block generation condition to create a hierarchical relationship between the blocks;
b) storing blocks and the hierarchical relationship between the blocks obtained by the block division processing; and
c) calculating the similarity between combination of data contained in a block and executing processing for combining groups each of which contains at least one data based on the calculation result of the similarity calculation along the hierarchical relationship between the stored blocks, wherein:

the step of executing processing for combining groups uses representative data of groups to calculate the similarity and determines whether the groups can be combined or not; and the step of executing processing for combining groups determines "integration possible" "integration impossible" or "continuous check" as the result of the similarity calculation based on the similarity between the data combination and, when the result is "continuous check" and the data that have been subjected to the similarity calculation are represented data, calculates the similarity between combination of different data contained in the groups to which the representative data belong and determines "integration possible" or "integration impossible".

7. The data clustering method according to claim 6, characterized in that
when performing additional block division processing, the step of creating the hierarchical relationship between blocks uses, as a new block generation condition, a block generation condition tighter than the original block generation condition.

8. The data clustering system method according to claim 6, characterized in that
the step of creating the hierarchical relationship between blocks divides the block based on simple similarity obtained using a method with a lower accuracy but with a lower calculation load and block generation condition, and
the step of executing processing for combining groups uses a method with a higher calculation load but with a higher accuracy to calculate the similarity.

9. The data clustering method according to claim 6, characterized in that
when moving to a new block along the hierarchical relationship between blocks, the step of executing processing for combining groups adds a check mark to a group containing only one data to exclude representative data of the group added with the check mark from the subsequent similarity calculation between the combination of data performed by the similarity calculation section.

10. The data clustering method according to claim 6, characterized in that
the data is a record on a database system.

11. A tangible computer-readable medium storing a data clustering program that causes a program-controlled computer to execute:
simple similarity calculation processing that divides a block containing at least one data based on a block generation condition;

block division processing that repeatedly performs block division processing that allows the simple similarity calculation processing to divide the block by supplying the block and block generation condition thereto to create a hierarchical relationship between the blocks obtained by the block division processing;

block storage processing that stores blocks and the hierarchical relationship between the blocks;

similarity calculation processing that calculates the similarity between combinations of data contained in a block; and block integration processing that allows the similarity calculation section to calculate the similarity between combination of data contained in a block and executes processing for combining groups each of which contains at least one data based on the calculation result of the similarity calculation section along the hierarchical relationship between blocks stored in the block storage section, wherein:

the block integration processing uses representative data of groups to allow the similarity to be calculated and determines whether the groups can be combined or not; and the similarity calculation processing determines "integration possible" "integration impossible" or "continuous check" as the result of the similarity calculation based on the similarity between the data combination and, when the result is "continuous check" and the data that have been subjected to the similarity calculation are represented data, calculates the similarity between combination of different data contained in the groups to which the representative data belong and determines "integration possible" or "integration impossible".

12. The computer-readable medium according to claim 11, characterized in that
when performing additional block division processing, the block division processing uses, as a new block generation condition, a block generation condition tighter than the original block generation condition.

13. The computer-readable medium according to claim 11, characterized in that
the simple similarity calculation processing uses a method with a lower accuracy but with a lower calculation load to calculate the simple similarity between data, and
the similarity calculation processing uses a method with a higher calculation load but with a higher accuracy to calculate the similarity between data.

14. The computer-readable medium according to claim 11, characterized in that
when moving to a new block along the hierarchical relationship between blocks, the block integration processing adds a check mark to a group containing only one data to exclude representative data of the group added with the check mark from the subsequent similarity calculation between the combination of data performed in the similarity calculation processing.

15. The computer-readable medium according to claim 11, characterized in that
the data is a record on a database system.

* * * * *